United States Patent

Duraj

(10) Patent No.: US 8,173,954 B2
(45) Date of Patent: May 8, 2012

(54) DETECTOR FOR USE IN WELL-LOGGING APPLICATIONS

(75) Inventor: Artan Duraj, Seven Hills, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 211 days.

(21) Appl. No.: 12/650,260

(22) Filed: Dec. 30, 2009

(65) Prior Publication Data

US 2010/0176286 A1 Jul. 15, 2010

Related U.S. Application Data

(60) Provisional application No. 61/141,608, filed on Dec. 30, 2008.

(51) Int. Cl.
*G01V 5/00* (2006.01)

(52) U.S. Cl. ....................................................... 250/262

(58) Field of Classification Search .................. 250/262, 250/269.1–269.8, 267
See application file for complete search history.

(56) References Cited

U.S. PATENT DOCUMENTS

| | | | |
|---|---|---|---|
| 3,609,366 A | 9/1971 | Schwartz | |
| 3,772,513 A | 11/1973 | Hall, Jr. et al. | |
| 3,988,581 A | 10/1976 | Peelman et al. | |
| 4,220,851 A | 9/1980 | Whatley, Jr. | |
| 4,300,043 A | 11/1981 | Robbins | |
| 4,764,677 A | 8/1988 | Spurney | |
| 4,766,543 A * | 8/1988 | Schmidt | 702/8 |
| 6,087,656 A | 7/2000 | Kimmich et al. | |
| 6,207,953 B1 | 3/2001 | Wilson | |
| 6,781,115 B2 | 8/2004 | Stoller et al. | |
| 7,383,142 B2 | 6/2008 | Scoullar et al. | |
| 2005/0139759 A1 | 6/2005 | Pitts et al. | |
| 2010/0116978 A1 * | 5/2010 | Stoller et al. | 250/262 |

* cited by examiner

*Primary Examiner* — Kiho Kim

(74) *Attorney, Agent, or Firm* — Abel Law Group, LLP; Robert T. Conway

(57) ABSTRACT

A detector includes a sonde having a housing and comprising a scintillator disposed within the housing and a calibration source coupled to the scintillator to fluoresce the scintillator at a known wavelength of electromagnetic radiation. The detector further includes an electromagnetic radiation sensing device coupled to the scintillator and disposed within the housing and a first programmable/re-programmable processing module (PRPM) coupled to the electromagnetic radiation sensing device and disposed within the housing. The PRPM is programmed to process signals from the electromagnetic sensing device based on a user-defined analysis mode selected from the group of modes consisting of filtering, windowing, discriminating, and counting.

20 Claims, 3 Drawing Sheets

DETECTOR FOR USE IN WELL-LOGGING APPLICATIONS

CROSS-REFERENCE TO RELATED APPLICATION(S)

The present application claims priority from U.S. Provisional Patent Application No. 61/141,608, filed Dec. 30, 2008, entitled "Detector for Use in Well-Logging Applications," naming inventor Artan Duraj, which application is incorporated by reference herein in its entirety.

BACKGROUND

1. Field of the Disclosure

The following is directed to a detector, and more particularly a detector including a signal processing system for use in well-logging applications.

2. Description of the Related Art

Spectral gamma ray measurements play a major role in oil and gas logging operations by providing a means for interpreting the porosity-lithology and naturally occurring radioactive materials in the surrounding rock strata. This is important to the oil and gas exploration industry because certain properties of rock formations can be directly correlated to the oil production performance of the strata within a field. For example, the amount of naturally occurring radioactive material can be correlated to conditions which are indicative of hydrocarbon producing formations.

However, the detection of gamma rays requires sensitive materials (i.e., scintillators) and complex electronics. In particular, the electronic components are often highly application-specific components that analyze the spectral information to ascertain certain properties of the surrounding rock strata. Additionally, the sensitive materials and complex electronics are subject to harsh environmental conditions, including continuous mechanical shocks and vibrations and broad temperatures ranges, from above-ground ambient temperatures to elevated temperatures that may be in excess of 150° C. Such conditions can cause change in the performance of the detector and thus inaccurate measurements by the scintillator and inaccurate analysis by the electronics. Accordingly, the industry continues to need improved detectors capable of reliable service and stable analysis over a wide range of temperatures.

SUMMARY

According to a first aspect a detector includes a sonde having a housing and including a scintillator disposed within the housing, a calibration source coupled to the scintillator to fluoresce the scintillator at a known wavelength of electromagnetic radiation. An electromagnetic radiation sensing device coupled to the scintillator and disposed within the housing, and a first programmable/re-programmable processing module (PRPM) coupled to the electromagnetic radiation sensing device and disposed within the housing, wherein the PRPM is programmed to process signals from the electromagnetic sensing device based on a user-defined analysis mode selected from the group of modes consisting of filtering, windowing, discriminating, and counting.

In another aspect, an article for use in well-logging applications includes a signal processing system including a microprocessor including a memory array for storing data, and a recorder module coupled to the processor for recording environmental conditions. A programmable/re-programmable processing module (PRPM) coupled to the processor and programmed to process signals from a radiation detector based on a user-defined analysis mode selected from the group of modes consisting of filtering, windowing, discriminating, and counting.

According to a third aspect, a method of forming a detector for use in well-logging applications comprising a user-defined analysis mode for a well-logging application, and programming a programmable/re-programmable processing module (PRPM) of a signal processing system based on the user-defined analysis mode. The method further includes sending the signals processed by the programmed system to the user.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
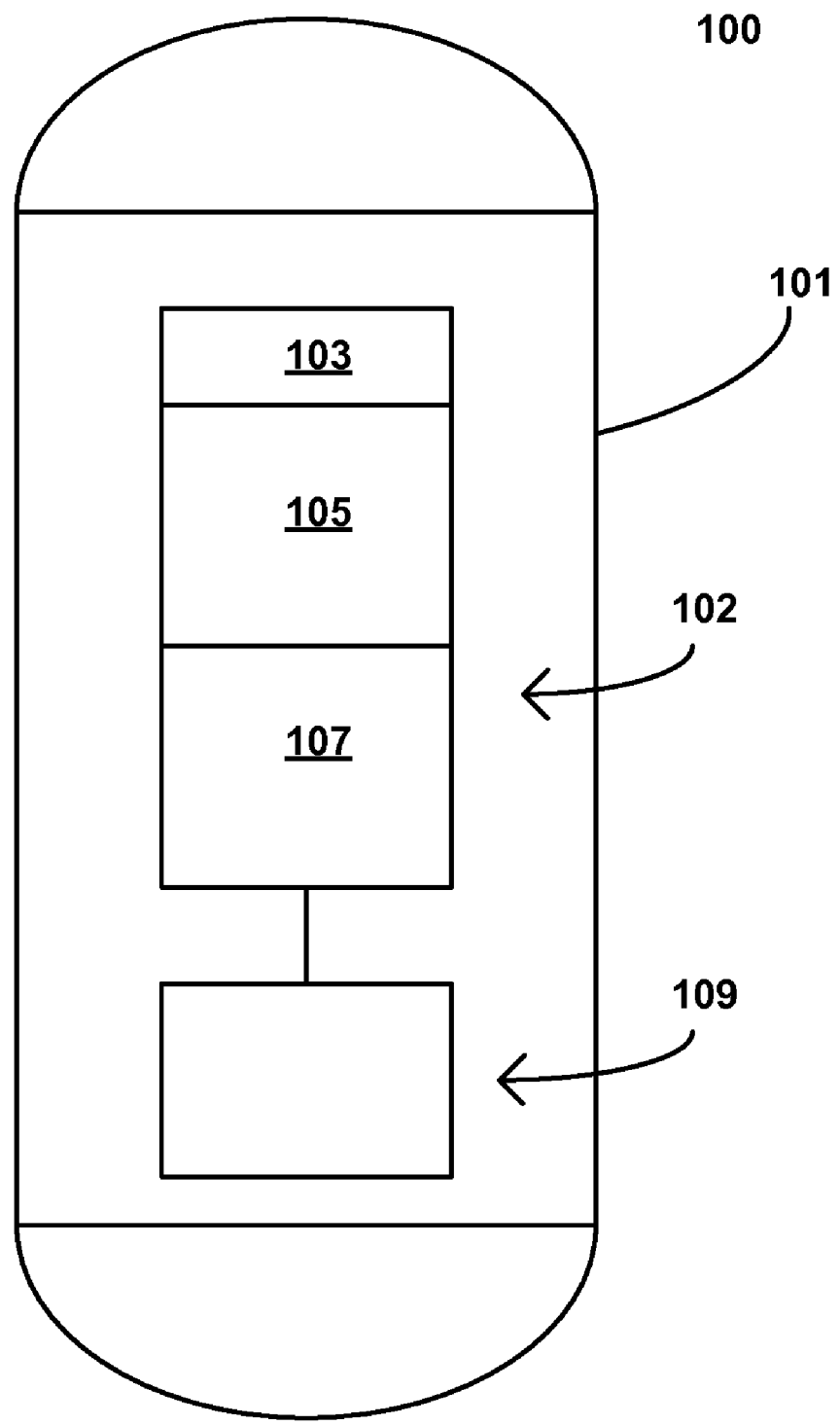
FIG. 1 includes an illustration of a detector including a sonde, radiation detector, and signal processing system in accordance with an embodiment.

FIG. 1 includes a cross-sectional illustration of a sonde including a radiation detector and signal processing system in accordance with an embodiment. Generally, a sonde 100 is a probe that can include certain detection devices and associated electronics for exploring regions and environments unsuitable for humans. One such application is exploratory drilling or well-logging applications in which holes can be drilled within the crust of the earth in order to explore and characterize rock structures below the surface. As illustrated, the sonde 100 can include a housing 101 for encapsulating and enclosing a radiation detector 102 and a signal processing system 109. The housing 101 can be made of a material suitable for withstanding harsh environments including large temperature shifts from ambient conditions to temperatures in excess of 150° C. Additionally, the housing 101 may be capable of withstanding severe mechanical stresses, shocks, and vibrations. As such, the housing 101 can be made of a metal or metal alloy material. Often, the housing 101 can be sealed to protect sensitive components inside from liquids, such as water, encountered in well-logging applications.

The radiation detector 102 can include materials and components suitable for detecting certain types of radiation in order to facilitate analyzing and characterizing rock structures surrounding the sonde 100, including properties such as the presence of hydrocarbon materials, presence of water, density of the rock, porosity of the geological formations, and the like. In particular, the radiation detector 102 can include a scintillator 105, a calibration source 103 coupled to the scintillator 105, and an electromagnetic radiation sensing device 107 coupled to the scintillator 105. Such components may be contained within a ruggedized housing suitable for resistance to temperature and shock and including those components as described in U.S. Pat. No. 4,764,677 incorporated herein by reference.

The scintillator 105 can be a material that responds to radiation by fluorescing at a known wavelength depending on the type of radiation. In accordance with an embodiment, the scintillator 105 can be made of different materials including crystalline materials, liquid materials, and/or gels, that can be inorganic or organic materials. Notably, depending on the type of material, the scintillator 105 can be sensitive to different types of radiation. Certain suitable inorganic crystalline scintillators can include halogen-containing materials, oxides, sulfides, or a combination thereof. The inorganic scintillator material may contain an alkali or rare-earth element. For example, some scintillator materials suitable for detecting gamma rays include activated lanthanum bromide, activated lanthanum chloride, activated sodium iodide, and activated cesium iodide. Particular activating species include cerium, thallium, praseodymium, europium, and neodymium. In one particular embodiment, the scintillator is thallium-activated sodium iodide. According to another embodiment, the crystalline material may be an elpasolite crystalline material, such as $Cs_2LiCl_6$:Ce. Certain other detectors use a liquid scintillator material, capable of operating at temperatures in excess of 150° C. In certain other embodiments, the scintillator includes an organic material, such as anthracene. Other suitable organic scintillator materials can include polymers such as polyvinyl toluene, polystyrene, acrylic, and a combination thereof.

In response to certain radiation, the scintillator 105 fluoresces at a known wavelength that can be converted to an electrical signal via the electromagnetic radiation-sensing device 107. Generally, the electromagnetic radiation-sensing device 107 is optically coupled to the scintillator 105, such as through a light pipe that is capable of transmitting the fluoresced radiation from the scintillator 105 to the electromagnetic radiation-sensing device 107. In accordance with an embodiment, the electromagnetic radiation-sensing device 107 can be a photomultiplier tube (PMT) that includes components suitable for transferring the electromagnetic radiation signal of the scintillator 105 to an electrical signal for processing by the signal processing system 109.

As further illustrated in FIG. 1, the radiation detector 101 includes a calibration source 103 coupled to the scintillator 105. In well-logging applications, the sonde 100 and radiation detector 102 may be subject to high temperatures. Such temperatures can have an adverse effect on the detector output. For example, depending upon the scintillator material, the loss in terms of fluoresced light output can be approximately 0.3% per degree Celsius increase, while losses for a radiation-sensing device 107 can be approximately 0.4% per degree Celsius increase. As such, the calibration source 103 provides a means for determining the decrease in performance of the scintillator 105 and radiation-sensing device 107, since the calibration source 103 is substantially unaffected by temperature changes and emits the same amount of radiation at a known wavelength over the range of temperatures, and such information can be used to establish a base line to which any decrease in fluorescence of the scintillator can be determined. Such changes in fluorescence can be accounted for by the signal processing system 109. For example, the signal processing system 109 can be gated to measure every pulse the light source causes, and the gain of the system can be adjusted by changing the gain of the electromagnetic radiation-sensing device 107, associated amplifiers within the signal processing system 109, and/or other means to maintain a substantially constant pulse height vs. energy curve at all times. Such a system is distinguished from radiation detectors having the calibration source coupled to the PMT, and further distinguished from calibration systems and methods using the data regularization or conditioning based on algorithms.

In accordance with an embodiment, the calibration source 103 can be a component capable of emitting radiation at a known wavelength suitable to fluoresce the scintillator 105. For example, in accordance with a particular embodiment the calibration source includes a light emitting diode (LED) or laser diode (LD). Some suitable LEDs include those that emit light within the ultraviolet portion of the spectrum. In other instances, the calibration source 103 can be a radioactive isotope. In one particular embodiment, the calibration source 103 can include radioactive isotopes, such as cobalt 60, ($Co^{60}$), cesium 137 ($Cs^{137}$), or americium 241 ($Am^{241}$), or one of the many lanthanum isotopes. Notably, the wavelength of radiation emitted by the calibration source 103 is such that it is only detectable by the scintillator 105, and the radiation-sensing device 107 is not sensitive to the particular wavelength of radiation emitted by the calibration source 103, such that only the radiation fluoresced by the scintillator 105 is detected by the radiation-sensing device 107.

As further illustrated in FIG. 1, the sonde 100 can include a signal processing system 109 electrically coupled to the electromagnetic radiation-sensing device 107. Generally, the signal processing system 109 is used for digitally processing the electrical signals from the electromagnetic radiation-sensing device 107 to enable a user to evaluate information gathered by the radiation detector 102. In accordance with embodiments herein, the signal processing system 109 includes component capable of selectable analysis modes based on application specific needs, which are described in more detail herein. While the signal processing system 109 is typically contained within the sonde such that the components are "down-hole", it will be appreciated that certain applications can utilize a signal processing system that is not down-hole, but located at the surface.

Figure 2A:
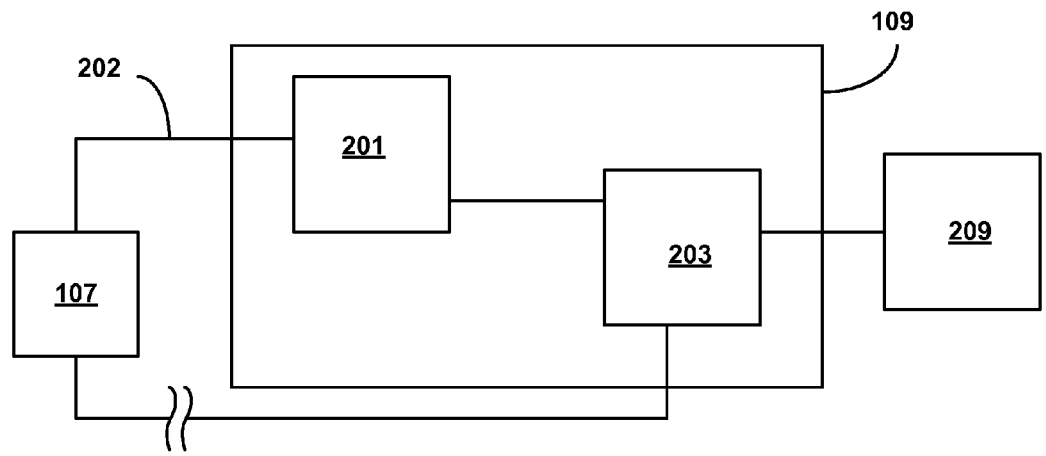
FIG. 2A includes a schematic view of a portion of the signal processing system in accordance with an embodiment.

FIG. 2A includes a schematic view of a portion of the signal processing system in accordance with an embodiment. As illustrated, the signal processing system 109 includes an analog-to-digital converter 201 that is coupled to a programmable/reprogrammable processing module (PRPM) 203. The PRPM 203 can be coupled to an output 209 and the radiation-sensing device 107. During use, the scintillator 105 can sense certain types of radiation, which in turn results in fluoresced radiation that is sensed by the radiation-sensing device 107 (e.g., PMT), which converts the fluoresced light signal to an electrical signal 202. The signal 202 is provided to the analog-to-digital converter 201, wherein the signal 202 is converted to a digital signal for analysis by the PRPM.

Notably, one of the functions of the PRPM is to facilitate calibration of the detector. During use of the detector, especially in non-isothermal conditions encountered in well-logging, the detector can experience increases in temperature, which can result in a decrease in fluoresced light output with regard to the scintillator 105 and decrease in performance with regard to the radiation-sensing device 107. The attenuation in the fluoresced light output can result in fewer registered counts (actual radiation events) as the amount of fluoresced light detected by the radiation-sensing device 107 decreases. The PRPM is capable of detecting the reduced signal from the radiation-sensing device 107 and adjusting the voltage (coarse adjustment) or gain (fine adjustment) of the radiation-sensing device 107 or other associated electronics, such as the amplifiers, thus compensating for the reduced fluoresced light output capabilities of the scintillator 105. It will be appreciated, certain electronic devices associated with the radiation-sensing device 107 that are not illustrated can be used, including for example, amplifiers and current-to-voltage converters for signal processing.

Figure 2B:
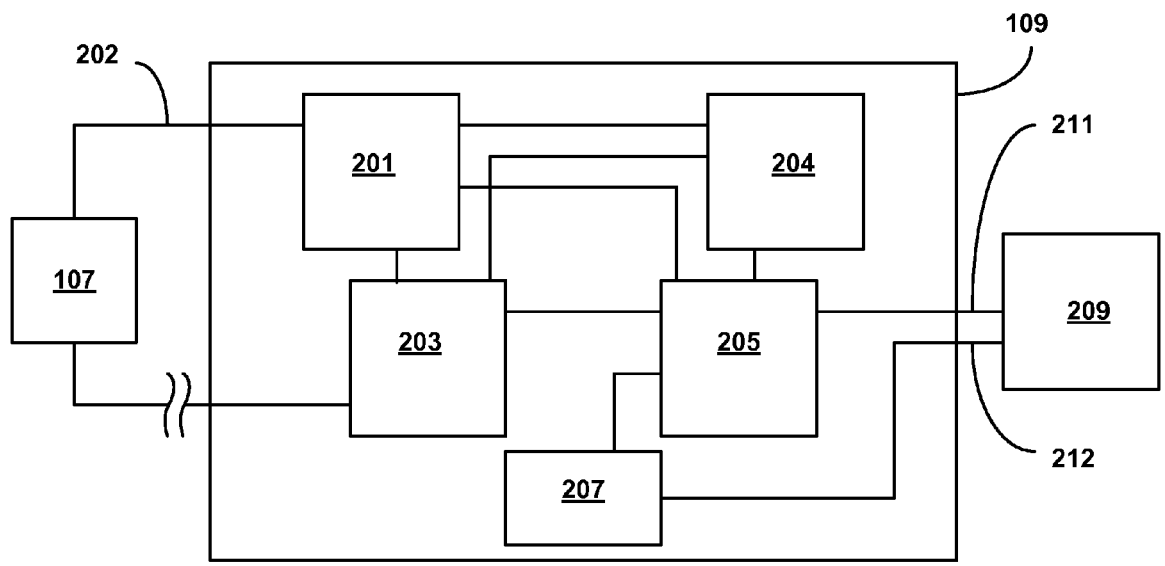
FIG. 2B includes a schematic view of a portion of the signal processing system in accordance with an embodiment.

FIG. 2B includes a schematic of a signal processing system in accordance with an embodiment. As illustrated, the signal processing system 109 can include an analog-to-digital converter 201, which is coupled to a programmable/reprogrammable processing module (PRPM) 203. Additionally, the analog-to-digital converter 201 can be coupled to an optional, external microprocessor 205, which in turn can be coupled to the PRPM 203. The signal processing system 109 further includes a recorder module 207 connected to the microprocessor 205 and an output 209, and the microprocessor 205 is also connected to output 209. The signal processing system 109 further includes an optional second PRPM 204 connected to the microprocessor 205.

During operation, a signal 202 from the electromagnetic radiation sensing device 107 can be sent to the signal processing system 109, and initially to the analog-to-digital converter 201. The analog-to-digital converter 201 converts the analog signal 202 to a digital signal in preparation for analysis by the PRPM 203. As will be appreciated, the signal 202 may be amplified via a preamp to increase the signal strength for processing. Such amplification may be completed prior to sending the signal 202 to the analog-to-digital converter 201.

The PRPM 203 can include logic components for processing of the signal 202 based upon a user-defined analysis mode. That is, the PRPM 203 can include programmable/reprogrammable logic components, which are initially programmed by the detector assembler based on user-defined analysis modes given the type of analysis that a user intends to conduct. The type of analysis is driven by the nature of the research and the information to be gathered, which can include various types of information as mentioned herein including for example, rock characteristics, porosity, density, and the like.

In accordance with an embodiment, suitable analysis modes can include filtering, windowing, counting, and discriminating. Filtering can include the use of at least two threshold values, such as an energy threshold value in which counts (i.e., radiation events recorded by the scintillator which result in a signal sent to the electromagnetic radiation-sensing device 107) not having energies between the two threshold values, or alternatively, counts above both threshold values or below both threshold values are removed (filtered out) from the output signal 211. Such filtering techniques may be suitable for removing noise and false counts from the final processed output signal for more effective and accurate evaluation of the properties of the surrounding rock strata. Windowing can include the use of multiple threshold values to include only those counts within two or more different and specific energy ranges to be included in the output signal 211. Windowing may be particularly useful when a user wants to filter out energies above and below a predetermined range for evaluation of counts associated with a certain energy level (i.e., radiation of a particular wavelength). Discriminating can include the use of the PRPM 203 to discriminate between two different types of radiation detected by the radiation detector based upon energy values, wavelengths, or even duration after a known pulse from a source on the sonde 100 (e.g., a neutron pulsing source). Discriminating may be particularly useful in situations where the scintillator is sensitive to multiple forms of radiation, for example gamma rays and neutrons. Additionally, discrimination may allow for discrimination between the two types of radiation and further processing of both signals, such as discrimination and separating the signals from each other. In other instances, a user may prefer a counting analysis mode wherein all forms of radiation detected above a specified threshold are counted. As will be appreciated, the PRPM 203 can be programmed to conduct a combination of analysis modes, for example, counting and filtering. The foregoing is an exemplary list of certain analysis modes, but is not considered an exhaustive list of signal processing analysis modes.

As further illustrated in FIG. 2B, the signal processing system 109 can include a second (and optional) PRPM 204 connected to the optional microprocessor 205 and the analog-to-digital converter 201 for processing the signal 202. The optional PRPM 204 can include components that are the same as PRPM 203, including programmable/re-programmable logic components for facilitating user-defined analysis of the signal 202. In accordance with a particular embodiment, the optional PRPM 204 is capable of being programmed to provide a different user-defined analyzing mode than the programmed user-defined analyzing mode of PRPM 203, and may provide more powerful parallel processing capabilities for users having demanding signal processing routines.

In accordance with an embodiment, the PRPM 203 can include logic components, such as logic gates. In one particular embodiment, the PRPM 203 includes an array of programmable logic gates, such that it is a field programmable gate array (FPGA). In certain other embodiments, the PRPM 203 can be complex programmable logic devices (CPLD). As such, the PRPM 203 includes programmable and reprogrammable logic such that the signal processing system can be tailored to user-defined needs and particularly, user-defined analysis modes. That is, the assembler of the signal processing system can program the PRPM 203 to provide a user with the ability to select and define the analysis mode capabilities of the system. Moreover, the detector can be reprogrammed, thus allowing change the analysis mode if so desired. Moreover, unlike standard processors, the PRPM 203 is fully integrateable with older technology or even newer technology.

The PRPM 203 can include an internal microprocessor contained within the PRPM 203 for controlling the logic functions of the device. Such microprocessors can be software-based, or alternatively, may include hardware. That is, in certain embodiments, the PRPM 203 can be a soft device, comprising software-based microprocessor containing instructions for controlling the logic functions. In other embodiments, the PRPM 203 can include a hardware-based, internal microprocessor that can include memory, such as volatile or non-volatile memory. The memory can store operating instructions for the PRPM 203, and additionally may store signal processing data.

According to an alternative design, the signal processing system 109 can include a separate microprocessor 205, which can include components suitable for controlling the operations of certain functions within the signal processing system 109. For example, the microprocessor 205 can include a controller for controlling the signal processing through the logic of the PRPM 203 and PRPM 204. More particularly, the controller may be connected to a timer module to control the timing of analysis operations by PRPM 203 and 204. The inclusion of a separate microprocessor may be suitable for designs incorporating multiple components as illustrated in the signal processing system 109 of FIG. 2B. The microprocessor 205 and PRPM 203 can be contained on the same chip, and more particularly, all of the components illustrated in FIG. 2B can be contained at the same device, notably at the same chip.

Additionally, the microprocessor 205 can include a memory array for storing data such as the processed signals from PRPMs 203 and 204 or the operating instructions for the PRPMs 203 and 204. The memory array within the microprocessor 205 can store information for other modules, components and devices within the signal processing system 109. For example, the memory array can store information from the recorder module 207. Such a memory array can include nonvolatile memory, for example, electrically erasable programmable read only memory (EEPROM). Other suitable types of memory can include flash memory devices. As further illustrated in FIG. 2, the microprocessor 205 is connected to an output 209 and may be programmed to provide a processed output signal 211 to the output 209.

As mentioned above, the signal processing system 109 can further include a recorder module 207 for recording and storing information pertaining to the environmental conditions of the detector during operation. Gathering of such information facilitates maintenance and troubleshooting of the detector, particularly in the context of malfunction or failure or of any of the components. The recorder module 207 can be connected to the microprocessor 205 for control of the operations of the recorder module 207 to facilitate storage of recorded information within the memory of the microprocessor 205. In an alternative embodiment, the recorder module 207 can include internal memory, which may include simple registers or other memory devices for storing recorded information. Alternatively or additionally, the recorder module 207 can be coupled directly to the output 209 such that it is capable of providing an independent output signal 212 of the environmental conditions within the housing 101.

The recorder module 207 includes components that gather information on the environmental conditions surrounding the detector such as temperature sensors and mechanical sensors suitable for determining and recording temperature conditions within the housing 101 and forces acting on the housing 101. For example, in one particular embodiment, the recorder module includes a system on a chip including multiple sensors (e.g., temperature sensors, mechanical sensors, etc.) a controller and memory array.

While reference herein to the recorder module 207 indicates that it includes a temperature sensor, it will be appreciated that temperature sensors (e.g., thermocouples) may be placed in strategic locations throughout the housing 101 to gather temperature measurements at different locations throughout the housing 101. Each of the temperature sensors can be connected to the recorder module 207 for storing and evaluating the temperature at each of the sensors within the housing. In certain instances, the one or more temperature sensors that are at the recorder module 207 or connected to the recorder module 207 can initiate a recording operation by the recorder module 207 upon reaching a threshold temperature value. For example, if one or more of the temperature sensors reach 125° C., the recorder module 207 can be turned to an activated state wherein the sensors are polled and data of the environmental conditions (e.g., mechanical shocks, etc.) are stored. Optionally, such data can also be sent to the output 209 and further to a remote storage location in real time.

As noted above, the recorder module 207 can include a mechanical sensor for measuring the mechanical shocks, vibrations, and the like on the housing 101 which may prove particularly suitable for troubleshooting applications, such as in conditions when a portion or device within the detector malfunctions or fails. Suitable mechanical sensors can include microelectromechanical systems (MEMs), such as gyroscopes, accelerometers, and the like. These devices can be integrated on a chip of the recorder module 207 for recording mechanical forces acting on the housing 101, such as stress, vibrations, and angular acceleration. In more particular instances, such MEMs devices can be strategically placed in various locations within the housing 101 to record and compile data regarding the forces acting on the housing 101.

Like the temperature sensors, in certain instances, the one or more mechanical sensors can initiate a recording operation by the recorder module 207 upon reaching a threshold mechanical force. For example, if one or more of the mechanical sensors detect excessive forces, the recorder module 207 can be turned to an activated state wherein the sensors are polled and data of the environmental conditions (e.g., temperature, shock, etc.) are stored. Optionally, the recorded data can also be sent to the output 209 and further to a remote storage location in real time.

In accordance with another embodiment, the recorder module 207 can include a timer module. In some instances, the timer module can be user-operated such that operation of the recorder module 207 is initiated by the user. In other instances, the timer module may be initiated upon reaching an environmental criteria, for example, a threshold temperature, threshold shock or vibration limit, or the like.

The microprocessor 205 is connected to the output 209, which can include one or more components for transmitting and/or presenting the processed output signals 211 and 212. According to an embodiment, the output 109 can include a data controller processor and interface for processing signals from microprocessor 205 and transmitting them to users. Suitable interfaces can include ports such as a universal serial bus (USB) port, serial pin connection, and the like. In certain applications, the output 209 may be capable of analyzing the processed output signal to provide user-defined outputs such as histograms, graphs, and other environmental data for evaluation of the rock strata surrounding the well.

The output 209 can be contained within the housing 101 of the sonde 100, or alternatively, the output 209 can be a component remote from the sonde 100. In the particular instance of well-logging applications, a component remote from the sonde may be a computer placed on the surface connected to the signal processing system 109.

Figure 3:
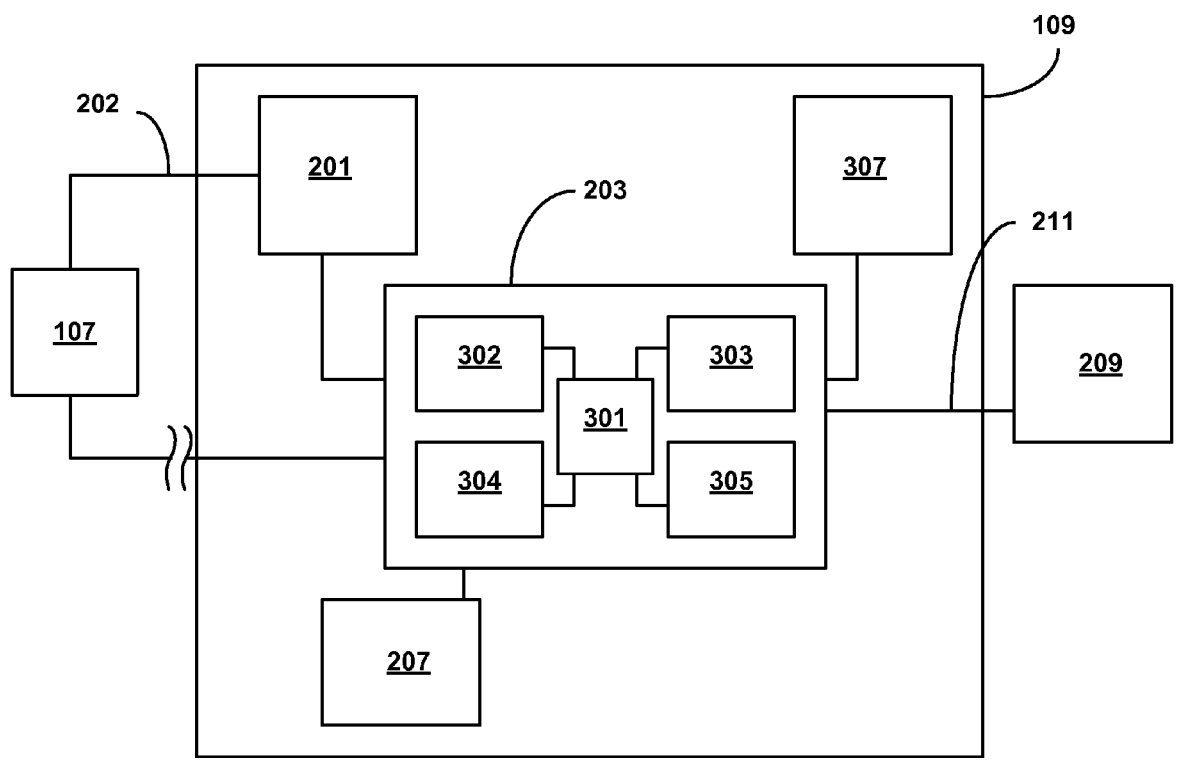
FIG. 3 includes a schematic of components within the signal processing system in accordance with an embodiment.

FIG. 3 includes a schematic of a signal processing system in accordance with an alternative embodiment. The signal processing system 109 includes components previously illustrated in FIG. 2 including the analog-to-digital converter 201, recorder module 207, and output 209. Notably, the programmable/reprogrammable processing module PRPM 203 is different than previously described. In particular, PRPM 203 is structured as a system-on-a-chip including a centralized, internal microprocessor 301 connected and integrated with an array of logic cores 302, 303, 304, and 305 (302-305). As such, the microprocessor 301 can include those components previously described in accordance with FIG. 2, notably including a controller for controlling the operations and instructions of the logic cores 302-305 and an internal memory, such as a nonvolatile memory, suitable for storing operation instructions, processed signal data or other information.

With respect to the logic cores 302-305, each of the logic cores 302-305 can include an array of logic gates such that each of the logic cores 302-305 are capable of carrying out logic functions independently, or in combination with any of the other logic cores. In accordance with a particular embodiment, each of the logic cores 302-305 can be programmed to carry out user-defined analysis modes of the signal 202. In fact, the PRPM 203 can be a software reconfigurable FPGA or other similar devices including a plurality of logic cores 302-305 coupled to each other and a central hardware or software microprocessor 301. Each of the logic cores 302-305 can be programmed to carry out a separate and single mode of analysis. In particular, the logic cores 302-305 can be programmed such that they are each capable of completing a different type of analysis mode. For example, a first logic core may be programmed to conduct a counting analysis, while a second logic core conducts a filtering procedure, and another conducts a windowing procedure.

Additionally, each of the logic cores 302-305 can function in concert with each other such that the processed output signal 211 has undergone multiple analysis modes through some or all of the logic cores 302-305. In fact, the processed output signal 211 can be a single signal 211 after a combination of processes have been completed by each of the logic cores 302-305. The multi-layered processing provides greater flexibility in signal processing according to user-defined analysis modes with greater efficiency. Moreover, while the recorder module 207 is illustrated as a separate module from the PRPM 203, it will be appreciated that in certain embodiments the PRPM 203 can further include the recorder module 207 on the same chip.

As further illustrated in FIG. 3, the signal processing system 109 can include a memory 307 connected to the PRPM 203. Such a memory 307 may be particularly suitable for storing information from the PRPM 203, or alternatively storing instructions, such as hardware description language (HDL) or source files for configuring the logic cores 302-305 of the PRPM 203.

While various embodiments of a signal processing system and its associated radiation detector have been described herein, the following describes a method for forming the detector 102 and methods for preparing the signal processing system for user-defined analysis. The process can be initiated, by polling an intended user of the preferred method(s) of analysis to determine user-defined analysis modes. The user may also be polled to determine the desired user-defined outputs for presentation of the analyzed signals. Upon determining the user-defined analysis modes, the one or more programmable/reprogrammable processing module (PRPM) of the signal processing system 109 can be programmed based upon the user-defined analysis modes. That is, the PRPM can be programmed such that it has the capabilities of filtering, windowing, discriminating, and/or counting depending upon the user's preferred analysis mode. Additionally, one or more PRPMs or logic cores within the PRPM can be programmed to enable multiple and/or combinatorial analysis modes.

After programming of the PRPM 203, the signal processing system 109 can be connected to the radiation detector 102. In particular, the signal processing system 109 may be connected to the electromagnetic radiation-sensing device 107 as illustrated in FIG. 1. This allows electrical signals that have been sensed and modified from photons to electrical signals by the electromagnetic radiation-sensing device 107 to be directed towards the signal processing system 109 for further analysis. It will be appreciated that reference to connection of such components herein is reference to direct or indirect electrical connections for transfer of signals, and accordingly such connections may include pins, wires, and/or wireless means.

The assembly process may further include a testing procedure prior to sending the radiation detector to a user. In particular, the testing process can include simulating a calibration process, in which the signal processing system 109 is tested through a calibration routine. Such a process can include placing the detector including the calibration source 103, scintillator 105, radiation-sensing device 107 and signal processing system 109 in an environmental chamber and exposing the detector to elevated temperatures over a duration to simulate temperatures likely to occur during well-logging. The testing procedure can include monitoring the response of the PRPM 203 under such conditions, and notably, determining if the PRPM 203 calibrates the detector by adjusting the gain or voltage (or both) of the radiation-sensing device 107 or associated electronics to compensate for the change to the signal. Additionally, monitoring can include monitoring of the analyzed output of the PRPM 203 for one or more of the user-defined analysis modes to determine if the change in signal affects the analysis by the PRPM 203.

After assembling the signal processing system 109 and radiation detector 102, the components can be sent to the user, either enclosed in the housing 101 of a sonde 100 or otherwise. As will be appreciated, the radiation detector can include a scintillator 105 and calibration source 103 as illustrated in FIG. 1.

During use, particularly those applications such as well-logging where the detector is subject to high temperatures and mechanical shocks, certain components within the detector may need servicing. In particular, the signal processing system 109 described herein includes a programmable/reprogrammable processing module (PRPM) that facilitates easy servicing. That is, in certain instances, a servicing procedure can be conducted on the PRPM that includes a testing procedure, wherein the assembler can test the programming of the PRPM to assure the user of proper functioning. Additionally, servicing can include re-programming procedures, in which the user sends the signal processing system back to the assembler and the PRPM can be re-programmed with certain user-defined analysis modes. Such re-programming can include re-programming the PRPM with new or different user-defined analysis modes.

Accordingly, the use of the signal processing system according to embodiments herein, and particularly the combination of components including the PRPM, recording module, microprocessor, and other features facilitate a signal processing system having improved flexibility based on user-defined analysis modes. While existing detectors utilize programmable logic devices for digital signal processing (see for example, U.S. Pat. No. 7,383,142) or the use of radioactive or non-radioactive pulsers for calibration (see for example U.S. Pat. No. 4,220,851), such detectors have drawbacks. Typically, logic devices of such detectors are highly specialized, intended for a single, particular task. Existing detectors generally do not have adaptable signal processing systems including programmable/reprogrammable processing modules capable of being programmed based upon user-defined analysis modes and reprogrammed to meet changing needs of users. Embodiments herein can have programmable/reprogrammable processing modules that are universally adaptable with multiple types of scintillators and calibration sources, having flexible capabilities based upon user-defined analysis modes and changing analysis needs, and demonstrate improved processing methodologies and maintenance. Such features are facilitated by a different combination and arrangement of devices including microprocessors, memory, recorder modules, and PRPMs.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A detector comprising:
    a sonde having a housing and comprising:
        a scintillator disposed within the housing;
        a calibration source coupled to the scintillator configured to fluoresce the scintillator at a known wavelength of electromagnetic radiation;
        an electromagnetic radiation sensing device coupled to the scintillator and disposed within the housing; and
        a first programmable/re-programmable processing module (PRPM) coupled to the electromagnetic radiation sensing device and disposed within the housing, wherein the PRPM is programmed to process signals from the electromagnetic sensing device based on a user-defined analysis mode selected from the group of modes consisting of:
            i) filtering, wherein filtering includes using at least two threshold values and removing a portion of the signals from the electromagnetic radiation sensing device;
            ii), windowing, wherein windowing includes using multiple threshold values to remove portions of the signals from the electromagnetic radiation sensing device and keeping portions of the signals within at least two different predetermined ranges; and
            iii) discriminating, wherein discriminating includes discriminating between at least two different signals from the electromagnetic radiation sensing device derived from two different types of radiation detected by the scintillator.

2. The detector of claim 1, further comprising a microprocessor electrically coupled to the PRPM.

3. The detector of claim 2, wherein the microprocessor comprises a memory array for storing data from the PRPM.

4. The detector of claim 2, wherein the PRPM and the microprocessor are contained on a same chip.

5. The detector of claim 4, wherein the PRPM comprises an internal microprocessor.

6. The detector of claim 1, further comprising a second PRPM disposed within the housing and coupled to the electromagnetic radiation sensing device, wherein the second PRPM is programmed to process signals from the electromagnetic radiation sensing device based on a user-defined analysis mode that is different than the user-defined analysis mode of the first PRPM.

7. The detector of claim 1, wherein the calibration source is a light emitting diode (LED).

8. The detector of claim 1, wherein the PRPM comprises a field programmable gate array (FPGA).

9. The detector of claim 8, wherein the PRPM further includes a non-volatile memory array coupled to the FPGA.

10. The detector of claim 1, wherein the PRPM is programmed to process signals from the electromagnetic sensing device based on a user-defined analysis mode of counting, wherein counting includes using a fixed threshold value to remove a portion of the signals below the fixed threshold value.

11. The detector of claim 1, wherein the scintillator includes a scintillator selected from the group of scintillators consisting of crystalline materials, liquid materials, and organic materials.

12. The detector of claim 1, wherein the scintillator is capable of detecting gamma rays and neutrons.

13. The detector of claim 1, further comprising a recorder module within the housing.

14. The detector of claim 13, wherein the recorder module is coupled to the PRPM.

15. The detector of claim 13, wherein the recorder module is coupled to a temperature sensor for recording the temperature within the housing.

16. An article for use in well-logging applications comprising:
    a signal processing system including:
        a microprocessor including a memory array for storing data;
        a recorder module coupled to the microprocessor for recording environmental conditions, including a mechanical sensor for recording forces acting on the signal processing system; and
        a programmable/re-programmable processing module (PRPM) coupled to the microprocessor and programmed to process signals from a radiation detector based on a user-defined analysis mode selected from the group of modes consisting of filtering, windowing, discriminating, and counting.

17. The article of claim 16, wherein the microprocessor includes a controller module for controlling operations of the memory array and the recorder module.

18. The article of claim 16, wherein the recorder module is coupled to a memory array for storage of recorded data.

19. The article of claim 16, wherein the recorder module comprises a temperature sensor for recording the temperature.

20. A detector comprising:
    a sonde having a housing and comprising:
        a scintillator disposed within the housing;
        a calibration source coupled to the scintillator configured to fluoresce the scintillator at a known wavelength of electromagnetic radiation;
        an electromagnetic radiation sensing device coupled to the scintillator and disposed within the housing;
        a first programmable/re-programmable processing module (PRPM) coupled to the electromagnetic radiation sensing device and disposed within the housing, wherein the PRPM is programmed to process signals from the electromagnetic sensing device based on a user-defined analysis mode selected from the group of modes consisting filtering, windowing, discriminating, and counting; and
        a second PRPM disposed within the housing and coupled to the electromagnetic radiation sensing device, wherein the second PRPM is programmed to process signals from the electromagnetic radiation sensing device based on a user-defined analysis mode that is different than the user-defined analysis mode of the first PRPM.

* * * * *